US007814287B2

(12) United States Patent
Pratt (10) Patent No.: US 7,814,287 B2
(45) Date of Patent: Oct. 12, 2010

(54) USING WRITEABLE PAGE TABLES FOR MEMORY ADDRESS TRANSLATION IN A HYPERVISOR ENVIRONMENT

(75) Inventor: Ian Pratt, Cambridge (GB)

(73) Assignee: XenSource, Inc., Palo Alto, CA (US)

( * ) Notice: Subject to any disclaimer, the term of this patent is extended or adjusted under 35 U.S.C. 154(b) by 636 days.

(21) Appl. No.: 11/487,945

(22) Filed: Jul. 17, 2006

(65) Prior Publication Data

US 2007/0016755 A1  Jan. 18, 2007

Related U.S. Application Data (60) Provisional application No. 60/699,808, filed on Jul. 15, 2005.

(51) Int. Cl.
*G06F 12/00* (2006.01)
*G06F 9/455* (2006.01)
*G06F 3/00* (2006.01)

(52) U.S. Cl. ............................ 711/163; 711/6; 711/207; 718/1; 719/319

(58) Field of Classification Search ............. 711/207, 711/163, 203, 205, 6; 718/1; 719/319
See application file for complete search history.

(56) References Cited

U.S. PATENT DOCUMENTS

| 6,075,938 | A | 6/2000 | Bugnion et al. | |
|---|---|---|---|---|
| 6,397,242 | B1 | 5/2002 | Devine et al. | |
| 6,438,671 | B1 | 8/2002 | Doing et al. | |
| 6,671,791 | B1 | 12/2003 | McGrath | |
| 6,785,886 | B1 | 8/2004 | Lim et al. | |
| 6,829,684 | B2 | 12/2004 | Doing et al. | |
| 7,310,721 | B2 * | 12/2007 | Cohen | 711/206 |
| 2003/0200412 | A1 * | 10/2003 | Peinado et al. | 711/202 |
| 2003/0208642 | A1 | 11/2003 | Desai et al. | |
| 2005/0091476 | A1 | 4/2005 | Doing et al. | |
| 2005/0097298 | A1 * | 5/2005 | Cohen | 711/206 |
| 2005/0160151 | A1 | 7/2005 | Rawson | |
| 2006/0095689 | A1 * | 5/2006 | Peinado et al. | 711/152 |
| 2006/0117169 | A1 * | 6/2006 | Peinado et al. | 713/1 |

* cited by examiner

*Primary Examiner*—Christian P Chace
*Assistant Examiner*—Mehdi Namazi
(74) *Attorney, Agent, or Firm*—Choate, Hall & Stewart LLP

(57) ABSTRACT

A method and system for using writeable page tables to increase performance of memory address translation in computing environments utilizing a hypervisor. Guest operating systems are given temporary write-access to a page table page after the system confirms that such page is not part of the current address space (i.e., confirming that the page is part of a different page table from the one that is currently in use, such as a different user-space process). Alternatively, if the page is part of the currently running page table, the system invalidates the appropriate entry in the root page directory, thus "unlinking" it, and ensuring that the appropriate region of virtual address space is flushed from the translation lookaside buffer (TLB) in the current CPU and others that may be using it. After giving the OS write-access, the page is added to a validation queue. Validation of all 1024 entries and "rehooking" of the page occurs whenever a page fault is taken due to the page being unhooked, or before context switching to another page table.

21 Claims, 5 Drawing Sheets

Figure 5

USING WRITEABLE PAGE TABLES FOR MEMORY ADDRESS TRANSLATION IN A HYPERVISOR ENVIRONMENT

CROSS REFERENCE TO RELATED APPLICATION

This application is based upon and claims benefit of copending U.S. Provisional Patent Application Ser. No. 60/699,808 entitled "Using Writeable Page Tables for Memory Address Translation in a Hypervisor Environment", filed with the U.S. Patent and Trademark Office on Jul. 15, 2005 by the inventor herein, the specification of which is incorporated herein by reference.

BACKGROUND OF THE INVENTION

1. Field of the Invention

This invention relates generally to memory management, and more particularly to systems and methods for using writeable page tables to increase performance of memory address translation in computing environments utilizing a hypervisor.

2. Background

Operating systems, or OS's, are typically designed to run multiple user processes, and more particularly multiple applications, each running in their own virtual address space in virtual memory. Through allocation of virtual memory to each such application, applications are provided a virtual address space in which they can operate, which address space is separate from all other applications. Such virtual address space may start at the 0 address and extend to, for example, 3 GB (or as far as the system architecture will allow). The use of virtual memory allows us to split physical memory (in which the user code and data actually resides) into chunks, and enables the OS to manage those chunks as they are needed for various applications. However, those chunks of physical memory that are used for a single application may not be arranged in a single contiguous region. Virtual memory provides a mechanism by which the chunks of physical memory may be managed with some structure to enable, from the user's perspective, generally contiguous and smooth operation of an application despite mapping portions of each such application into and out of relevant blocks of physical memory as required. In order to properly interrelate the virtual memory locations with physical memory locations, the virtual memory system will translate virtual addresses to physical addresses, storing mappings from one to the other in a page table.

Both the virtual and physical memory are divided into chunks. On an x86 architecture, the virtual address space and physical memory address space are both commonly split into pages 4 kilobytes in size (for physical memory, such chunks are sometimes referred to as "page frames" or simply "frames" instead of pages). Memory that is allocated to each application is allocated in pages within the physical memory of the system. Notably, those pages in physical memory may not be contiguous, because as pages get used, new applications get started and/or terminated, and memory becomes fragmented. For example, an instruction for a user process might start at the virtual address 0x00000004, indicating page number 0x0, and offset 0x004. In reality, this may correspond to the physical address 0xff0e0004, indicating frame number 0xff0e, and offset 0x004. Another instruction for that same application may be in an entirely distinct physical address region in physical memory. Thus, it is necessary to translate from a given virtual address that the application sees to a physical address. The virtual memory system converts the virtual addresses into physical addresses, essentially mapping between pages and frames, using the page table.

In the case of the Intel x86 processor, such memory management is implemented using hardware page tables. For each application that is running, the OS maintains a page table, the format of which is determined by the x86 specification. When the user switches from one application to another, the CPU switches to the page table associated with the selected application. In the case of the basic 32-bit x86 architecture, the format of the page table is a 2-level page table. The page table translates 32-bit virtual addresses into 32-bit physical address. Analyzing the structure of each such 32-bit address, it comprises 12 least significant bits that are the offset within the page and an additional 20 bits. When translating from a virtual page number to a physical page number, the 12 bits proceed through such translation unmodified. The remaining 20 bits, however, are divided into 2 lots of 10 bits each and, as discussed in detail below, are used to ultimately identify the address in physical memory to which the virtual address is to be translated.

As a preliminary matter, however, we note that for every process the OS maintains a page table and the hardware is configured such that whenever the user starts running a new process, it first points to the root of the page table for that process. The root of the page table is itself a page referred to as the page directory ("PGD"). The PGD is a page that has been allocated in memory that uses a number of further pages to represent a hierarchical page table structure that defines the translation. The PGD is referred to herein as an "L2," because it is the root of a 2-level page table, i.e., the uppermost level (level 2). Likewise, all of the leaves of the page table are referred to herein as "L1." The L2 PGD thus contains pages of 4 kb each, and we consider the PGD as having 1024 entries, each of which is 4 bytes in size. When performing a translation, i.e., when the hardware wants to convert a virtual address into a physical address, the first thing that the hardware does is to look at the most significant 10 bits of the virtual address, and use those 10 bits as an index into the 1024 entries in the L2 PGD. The hardware will thus extract one of those 4-byte entries. Within the extracted 4-byte entry there is another 20 bits of address information along with 12 bits containing status information. The 20 bits indicate the physical machine frame number of the L1 page table page that must next be consulted to perform the translation. The L1 page table page is very similar to the PGD, containing 1024 entries, each of 4 bytes. The next most significant 10 bits of the virtual address are then used to index into the identified L1 page table. The resulting entry in that L1 page table comprises 4 bytes that again contain 20 bits and 12 bits as above. The 20 bits produced from this entry indicate the physical frame number to which the virtual page number needs to be converted. That will serve as the memory location that the hardware actually reads from or writes to when the application refers to a particular virtual address. The remaining 12 bits that index within the page are combined with that new physical page frame number to produce the actual physical address that is to be accessed.

The issue of translating virtual addresses to physical addresses becomes more complicated in a hypervisor environment. In a virtual machine ("VM") environment, a single physical machine with one or more physical processors combines with software to simulate multiple virtual machines. Each of those virtual machines requires access to some of the physical resources of the computer on which it resides. A hypervisor controls the assignment of resources to each virtual machine. Thus, the hypervisor, as opposed to the OS's on the virtual machines, typically controls the allocation of physical hardware resources. The hypervisor typically intercepts requests for resources from the OS's on the virtual machines and manages those requests to avoid conflict among the separate OS's. As the OS is traditionally the most privileged entity running on the computer, and thus in the typical case has the ability to manipulate virtual and physical memory, in a hypervisor environment it is necessary to restrict such capabilities. The way that most hypervisors provide for such control is through the use of shadow page tables. In this case, the guest OS's that are running on the computer will, as discussed above, maintain their own page table structures for each of their own processes. The page tables that the hardware is aware of are entirely separate and maintained by the hypervisor. It has been found, however, that it is advantageous to allow the guest OS to directly use the hardware page tables, thus avoiding the memory cost of an additional copy and the computational cost of keeping the two copies synchronized. To do so requires careful control to ensure that manipulations by one OS do not conflict with any other OS's (e.g., one OS must be prevented from accessing another OS's memory).

A system and method allowing the hardware page tables to be the same page tables that the guest OS's are manipulating is described in "Xen and the Art of Virtualization," published in the Proceedings of the Association of Computing Machinery (ACM) 19$^{th}$ Symposium on Operating Systems Principles (SOSP19), October 2003, and incorporated herein by reference. As described therein, each guest OS is capable of reading all of its own page tables, having a page table for every process of which that OS is aware. However, while the guest OS's are fully capable of reading their own page tables, writing to those page tables could be problematic. If a guest OS could write directly to a page table, it could create any value into one of the L1 or L2 page tables, and could particularly input to such page table a 20-bit value that refers to a page frame that it does not own. That is, it could refer to one of possibly a million pages in the system that is not allocated to that OS. It is thus necessary to check that any value that is being placed into the page directory or into the page tables (i.e., the L2 and L1, respectively) refers to pages that the subject OS owns. Otherwise, such an entry could create a mapping to a page owned by another OS which, when used by hardware, could read or even corrupt another OS's data. Further, it is necessary to check that the value being written into the page table does not create a writeable mapping to a page that is being used as an L1 or L2 page table page, since otherwise this mapping could be used to update the page table directly and hence circumvent the hypervisor.

Thus, whenever a guest OS attempts to write to its page table, the hypervisor is invoked through a fault handler which in turn evaluates the attempt by the guest OS to write a particular value into one of the L1 or L2 pages to determine whether the attempted write corresponds to a page frame that the OS owns. If the OS does own that page frame, the write is allowed to proceed, by emulating the access in the hypervisor. Such updates are typically performed in batches. Thus, in a simplistic implementation of the foregoing, every time a write is performed to update a page table, the hypervisor would be invoked to check whether the update is valid. If the update is deemed valid, the hypervisor would perform the access, and then return control to the OS at the instruction following the page table write.

Thus, using the above described method, wherever a page table page is written to by a guest OS, the system faults into the hypervisor, performs the update, and returns. However, typical OS operations, such as exiting or otherwise terminating an application process, result in many such consecutive updates in order to destroy the process's page tables. The OS thus proceeds through a loop, terminating all of the L1's by zeroing them and zeroing the L2, such that the process page table is effectively "dead." This requires a large number of page table updates to be performed in a batch. Similarly, when creating a new process, OS's will typically take the currently running application and create a copy of its page table. Once again, a loop is performed which reads from the current page table and builds a new page table. Thus, the OS will allocate a page to be the L2, the entries will be copied across and a set of pages will be allocated to be the L1's (up to 1024 for a given process). These large sets of updates can lead to a large increase in process creation and process termination time, particularly if a simple emulation scheme is employed which requires entering and leaving the hypervisor frequently.

Thus, there remains a need in the art for a system and method capable of efficiently carrying out memory address translation in a hypervisor environment.

SUMMARY OF THE INVENTION

Disclosed herein are systems and methods for efficiently carrying out memory address translation in a hypervisor environment. Particularly, it has been discovered that improved efficiency may be obtained by using writeable page tables. Thus, a particularly preferred embodiment of the invention provides the guest OS's with writeable mappings to their page tables. The guest OS's are given temporary write-access to the page after the system confirms that such page is not part of the current address space (i.e., confirming that the page is part of a different page table from the one that is currently in use, such as a different user-space process). Alternatively, if the page is part of the currently running page table, the system invalidates the appropriate entry in the root L2 PGD, thus "unlinking" it, and ensuring that the appropriate region of virtual address space is flushed from the translation lookaside buffer (TLB) in the current CPU and others that may be using it. After giving the OS write-access, the page is added to a validation queue. Validation of all 1024 entries and "re-hooking" of the page occurs whenever a page fault is taken due to the page being unhooked, or before context switching to another page table.

With regard to one aspect of a particularly preferred embodiment of the invention, a method of managing memory in a processing system capable of simultaneously executing multiple instantiations of one or more guest operating systems is provided, in which a determination is made of whether a page table page to which a guest operating system is attempting to write is part of a page table page currently in use by such processing system. Upon determining that such page table page is not part of a page table page currently in use by such processing system, temporary write access is granted to the guest operating system to such page table page. Likewise, upon determining that such page table page is part of a page table page currently in use by such processing system, such page table page is unlinked from a page directory to which the page table page belongs, and thereafter temporary write access is granted to the guest operating system to such page table page. With regard to further aspects of such particularly preferred embodiment, after granting such write access, and preferably upon either an attempt by the guest operating system to access a virtual memory address that requires such page table page, or in response to the guest operating system attempting to context switch from a first process to a second process, entries in such page table page may be validated to confirm that such entries refer to a page table page attributed to such guest operating system, and that such entries do not act to create a writeable mapping to any other page table page.

With regard to an aspect of a second particularly preferred embodiment of the invention, a memory management structure is maintained by a hypervisor program executing within a processing system that implements methods in accordance with embodiments of the invention. With regard to such second particularly preferred embodiment, the hypervisor program forms a computer program when stored on media, in a memory, or transferred through a signaling mechanism such as a network download transmission. Such memory management structure determines whether a page table page to which a guest operating system is attempting to write is part of a page table page currently in use by such processing system. Upon determining that such page table page is not part of a page table page currently in use by such processing system, the memory management structure grants temporary write access to the guest operating system to such page table page. Likewise, upon determining that such page table page is part of a page table page currently in use by such processing system, the memory management structure unlinks such page table page from a page directory to which the page table page belongs, and thereafter grants temporary write access to the guest operating system to such page table page. With regard to further aspects of such particularly preferred embodiment, after granting such write access, and preferably upon either an attempt by the guest operating system to access a virtual memory address that requires such page table page, or in response to the guest operating system attempting to context switch from a first process to a second process, such memory management structure validates entries in such page table page to confirm that such entries refer to a page table page attributed to such guest operating system, and that such entries do not act to create a writeable mapping to any other page table page.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION

The invention summarized above may be better understood by referring to the following description, which should be read in conjunction with the accompanying drawings. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

A system and method is described herein to detect whether a page is part of the current page table or not by the hypervisor storing the locations at which a particular L1 appears in the virtual address space. We exploit the fact that in most OS's a single L1 page will be used to construct some single part of the virtual address space, and although it may appear in multiple page tables (and hence multiple L2's) it will always appear at the same entry number in each L2. L1 pages that do not obey the above rule must be marked as such, and typically may not be the subject of temporary writeable mappings (or require additional storage to record all the L2 entry numbers in which they appear rather than just enforcing a single location, which is sufficient for most OS's). This enables us to quickly find out whether a L1 is part of the current page table, and to be able to unhook it if it is. We then may unhook the L1 from the L2 if needed, create a writeable mapping, allowing the OS to perform all of its updates very quickly by writing directly to the page, and finally either perform the validation before the OS changes the page table base, or perform the validation as a result of the OS taking a page fault which occurred because the page was unhooked, i.e., it was trying to use part of the virtual address space that was currently unhooked.

When giving an OS a writeable mapping to its page tables, the system first must confirm that the hardware cannot access this page to perform a translation. If the OS were to write something illegal (for example an entry that allowed it to access another guest OS's page into one of the L1 page tables) and were then to cause the hardware to use that page table entry, error conditions would result. Hence it is necessary to ensure that the hardware is not currently able to read values out of the particular L1 page being updated. It is thus important to determine ab initio whether the L1 is part of the current page table or part of one that belongs to some other process that is not running at the moment. Obviously, if building a new process, the subject page table cannot be running at the moment, and thus it belongs to some other page table that is not currently in use. If it is the case that the subject page table is a page table that is not currently in use, then the guest OS is given write access to that page. Then, before the OS tries to change which page table is in use, the system calls back into the hypervisor. The hypervisor remembers that it has given the guest OS writeable access to an L1 page, removes write access to that page, synchronizes the associated TLB entry, and proceeds to look through all 1024 entries in that page, looking for all of the ones that have changed since it last performed a validation, and checks that all entries are valid. In the event one of the entries is invalid an error condition is signaled.

A complication exists if the subject page table is part of the currently running page table, because when it is copying entries across and creating the new process, it is also making updates to the current page table to change the status bits. Thus, it is writing to the current page table, which could be problematic. To prevent this from happening, the L1 is "unhooked" from the L2 as discussed in greater detail below.

Hence a key requirement when a guest OS writes to an L1 page is to quickly determine whether that page is in the current page table or not. Note that the location of the L1 page within the L2 PGD is known. Thus, for every L1, the system remembers in which of the 1024 possible entries it appears. An L1 might appear in multiple L2 PGD's, but it will appear within the same location within each L2. Thus, given the known offset X of the particular L1 in any L2, the hypervisor will look at the $X^{th}$ entry in the L2 that is currently being used by the hardware. The particular 4-byte entry in slot X for the L2 in use is accessed, and the most significant 20 bits in that entry are examined to determine whether the frame number refers to the subject L1. If it does not, then the L1 must belong to some other page table and not be part of the current page table, and the system can safely provide the guest OS with a writeable mapping allowing it to do all of the updates. The system will also perform a validation as mentioned above before allowing the hardware to change the PGD to a different L2.

Alternatively the hypervisor might examine the $X^{th}$ entry in the L2 and finds it contains the frame number of the subject L1. In this case, the L1 is actually part of the current page table. If the system now provides the OS with a writeable mapping, it could violate the protection afforded by the hypervisor. Thus, it is necessary to "unhook" the L1 from the L2 by zeroing out the $X^{th}$ entry in the L2 page directory (that is, the entry that contains the reference to this L1). Thus, instead of the 20 bits pointing to this L1, the entry comprises all 0's, and so if the hardware looks for new entries in the table, it will not see the existence of this L1. If an attempt is then made to access a virtual address that requires this particular L1 as part of the translation, another page fault will occur and the hypervisor will be activated. In this case, the hypervisor will recognize that the fault has occurred because an entry has been removed from the L2, and will reconnect the L1 to enable the OS to continue, i.e., enable the instruction the OS was running to proceed. Before such reconnection, however, all of the entries in the L1 are scanned, each being checked to confirm it is valid (i.e., refers to a page the guest OS owns, and does not act to create a writeable mapping to any other page that is part of a page table).

To ensure correctness, then, before the validation scan is performed, the writeable mapping that the OS has to that L1 page is converted to a read-only mapping. The validation scan is then performed and, assuming the validation succeeds, the L1 is reconnected back into the L2. Finally control is returned to the OS, which then reissues the particular instruction. This time it will succeed because the hardware is now able to walk down the page table performing the translation without faulting.

When updating an L2, it is sufficient to simply take the fault and emulate the instruction's behavior in the hypervisor because there are far fewer updates of L2 pages than L1 pages. Also, it is noted that in a simpler but perhaps less efficient implementation, one may also scan the entire L2 to determine whether the L1 is part of the current page table (rather than maintaining the backpointer to the particular L2 entry number).

Figure 1:
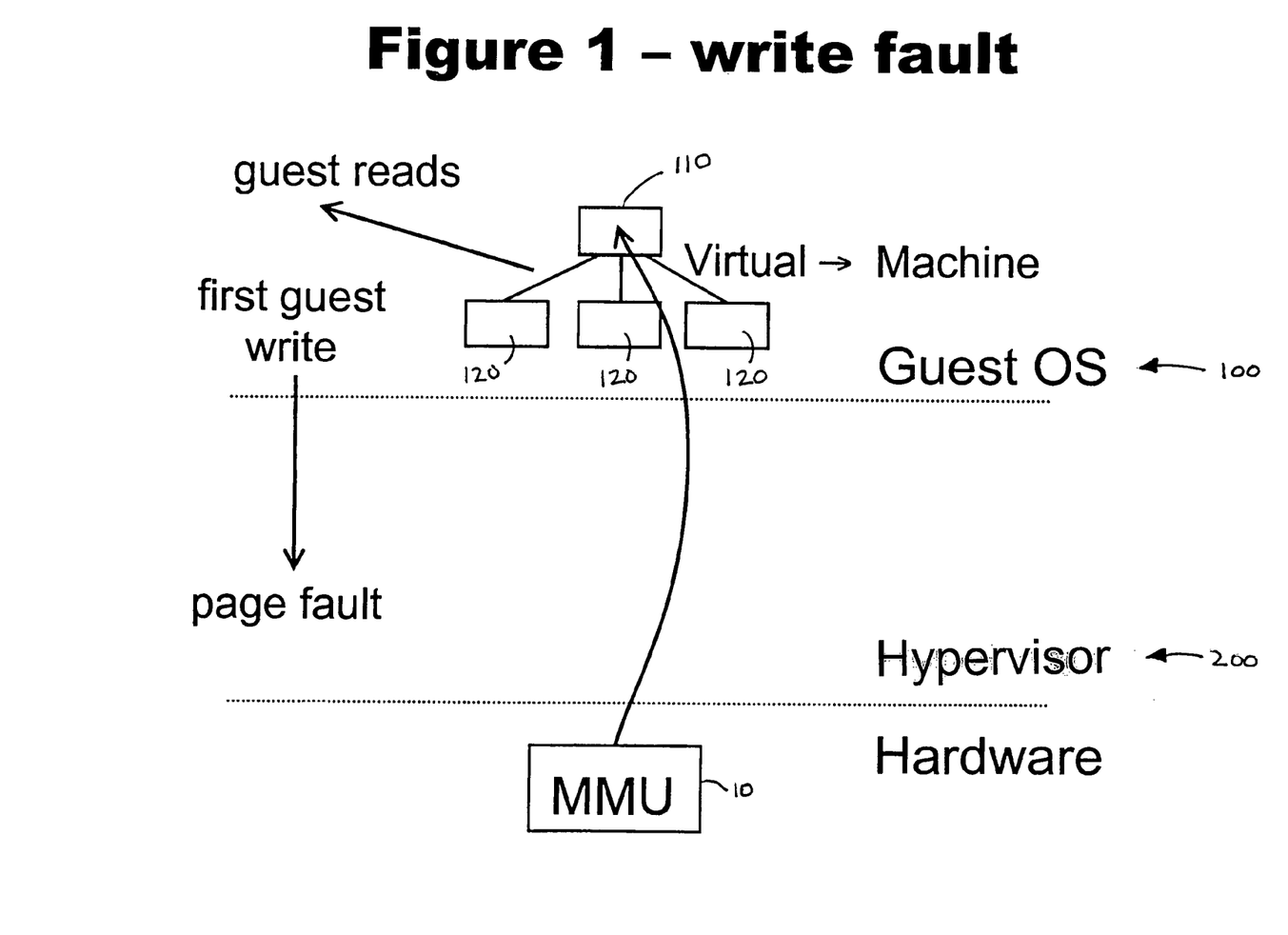
FIG. 1 is a schematic representation of a first aspect of a method for memory address translation in a hypervisor environment.
Figure 2:
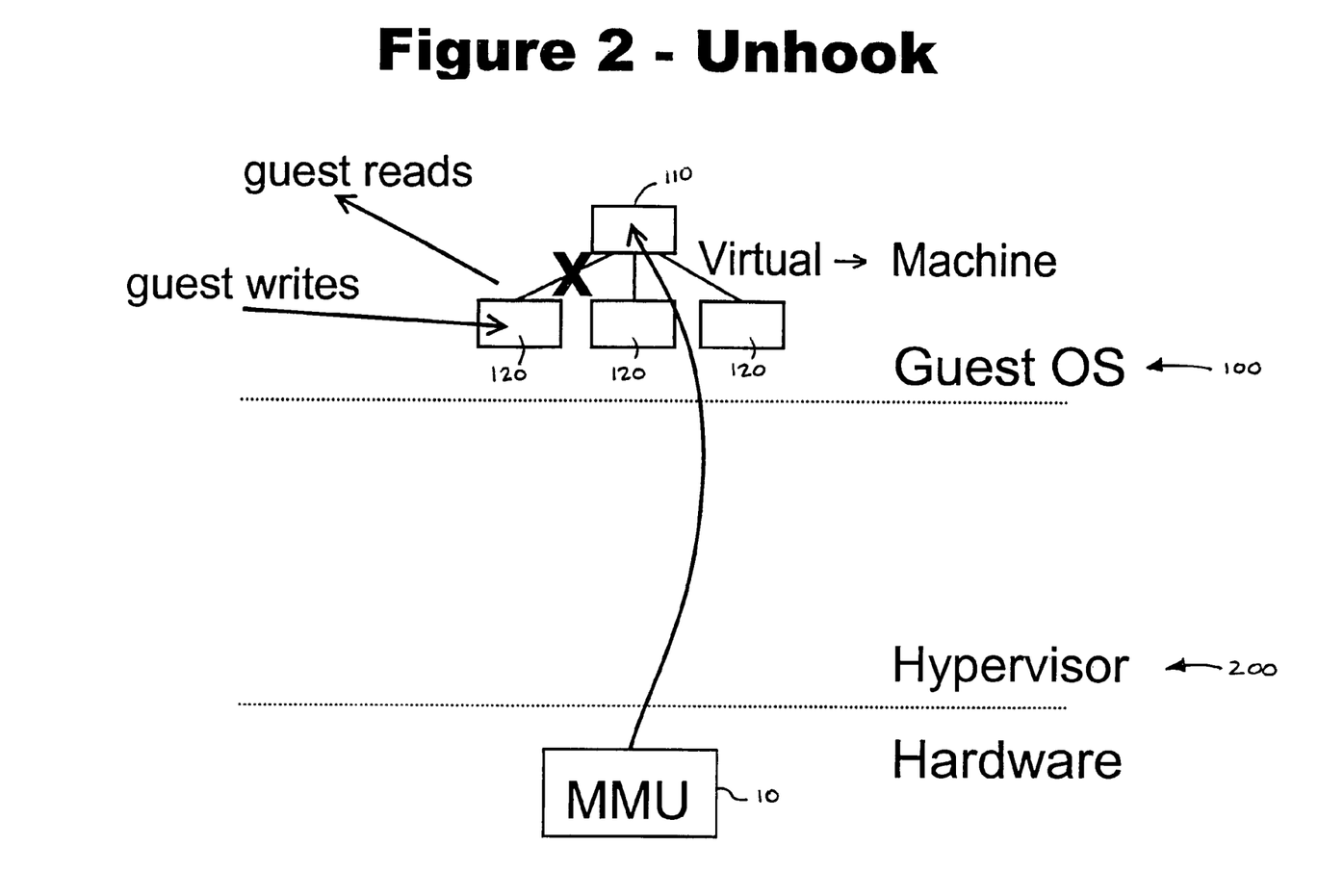
FIG. 2 is a schematic representation of a second aspect of a method for memory address translation in a hypervisor environment.
Figure 3:
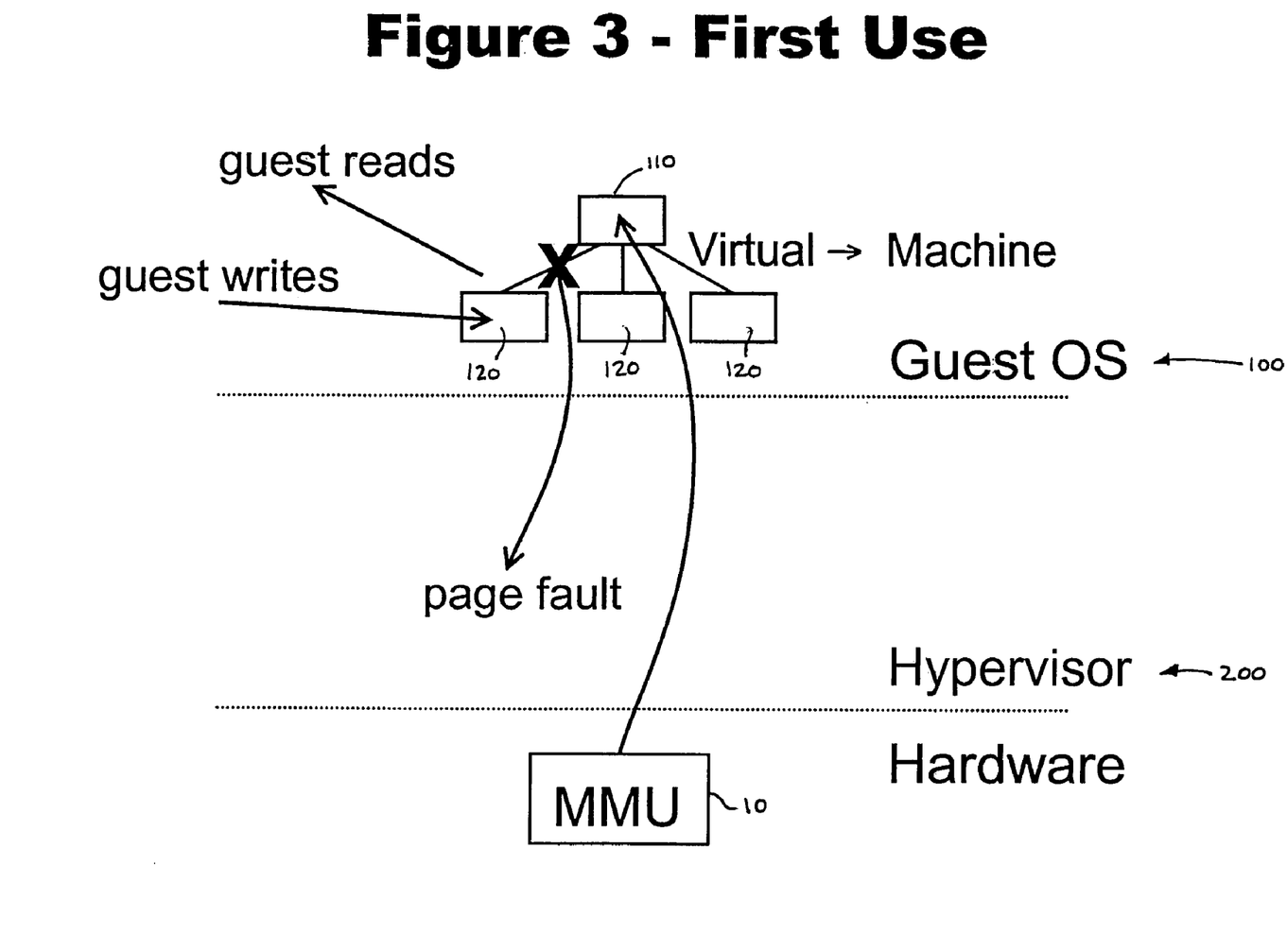
FIG. 3 is a schematic representation of a third aspect of a method for memory address translation in a hypervisor environment.
Figure 4:
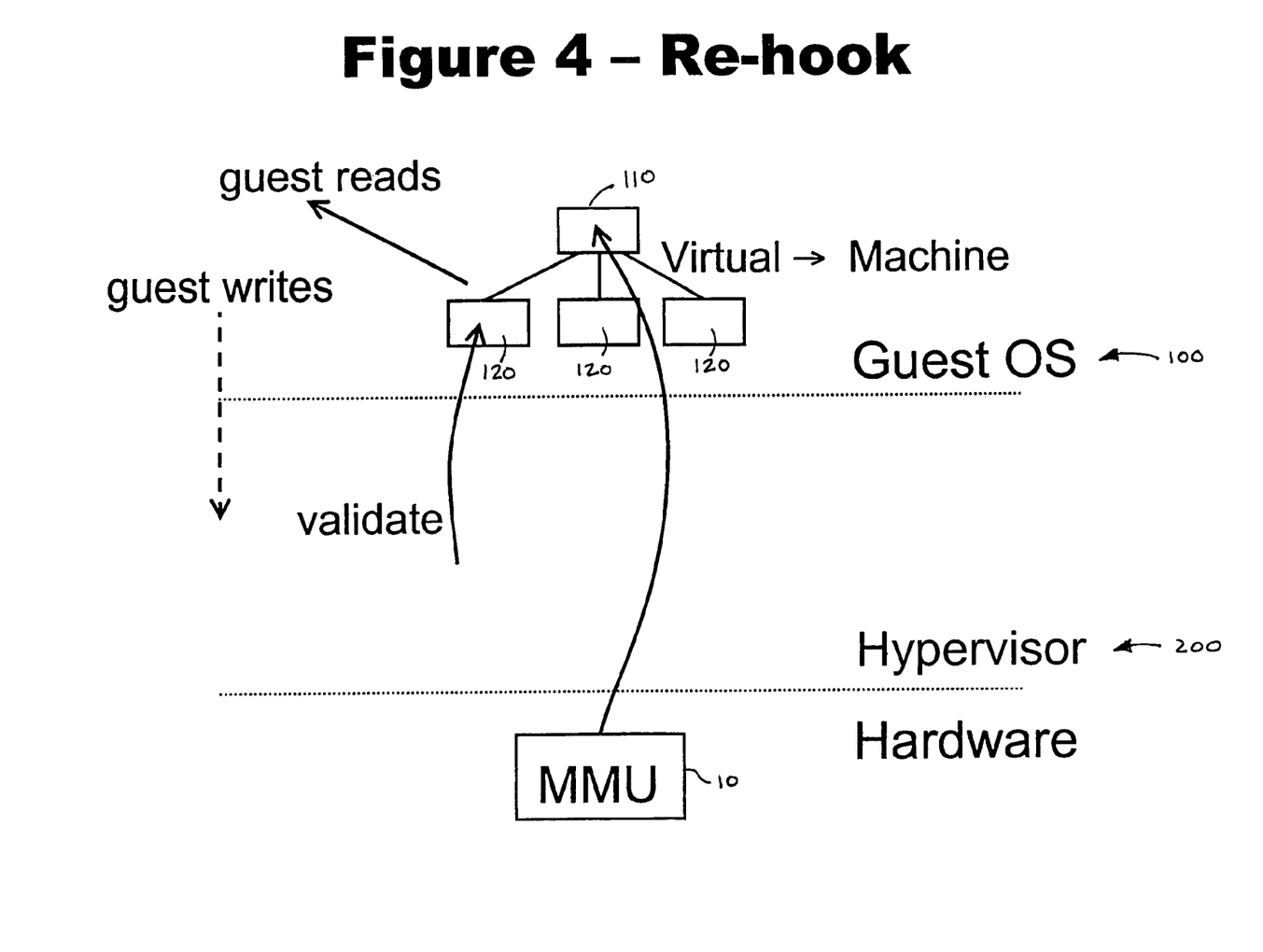
FIG. 4 is a schematic representation of a fourth aspect of a method for memory address translation in a hypervisor environment.

The above-described process is shown schematically in FIGS. 1-4. More particularly, in FIG. 1, the hardware memory management unit ("MMU") 10 is pointing to the root 10 of the L2 page directory. In this case, the guest OS 100 may read from the L1 page table entries 120 under that L2, but it cannot have writeable mappings to those page table pages. If the OS 100 attempts to write to such L1 page table pages 120, it will take a page fault and end up in the hypervisor 200. As shown in FIG. 2, if the guest OS's write attempt is to an L1 120 which is part of the current page table, then that L1 120 is unhooked from the L2 page directory 110, and the write is allowed to proceed as described above. Then either when the page table base changes, or if the guest OS 100 tries to use a virtual address that requires that particular L1 120 to be used, then another page fault is taken and that L1 120 is unhooked from the L2 110. As shown in FIG. 3, the page fault results because the OS 100 is attempting to use that particular virtual address which requires that particular L1 120. As shown in FIG. 4, the temporary writeable mapping given the guest OS 100 is removed, and the hypervisor 200 validates the page to check that all of the entries are valid. Once their validity is confirmed, we re-hook the L1 120 back into the L2 110 and then return to the guest OS 100. The OS 100 will then reissue the particular instruction that caused the fault, and will be able to proceed as before.

Figure 5:
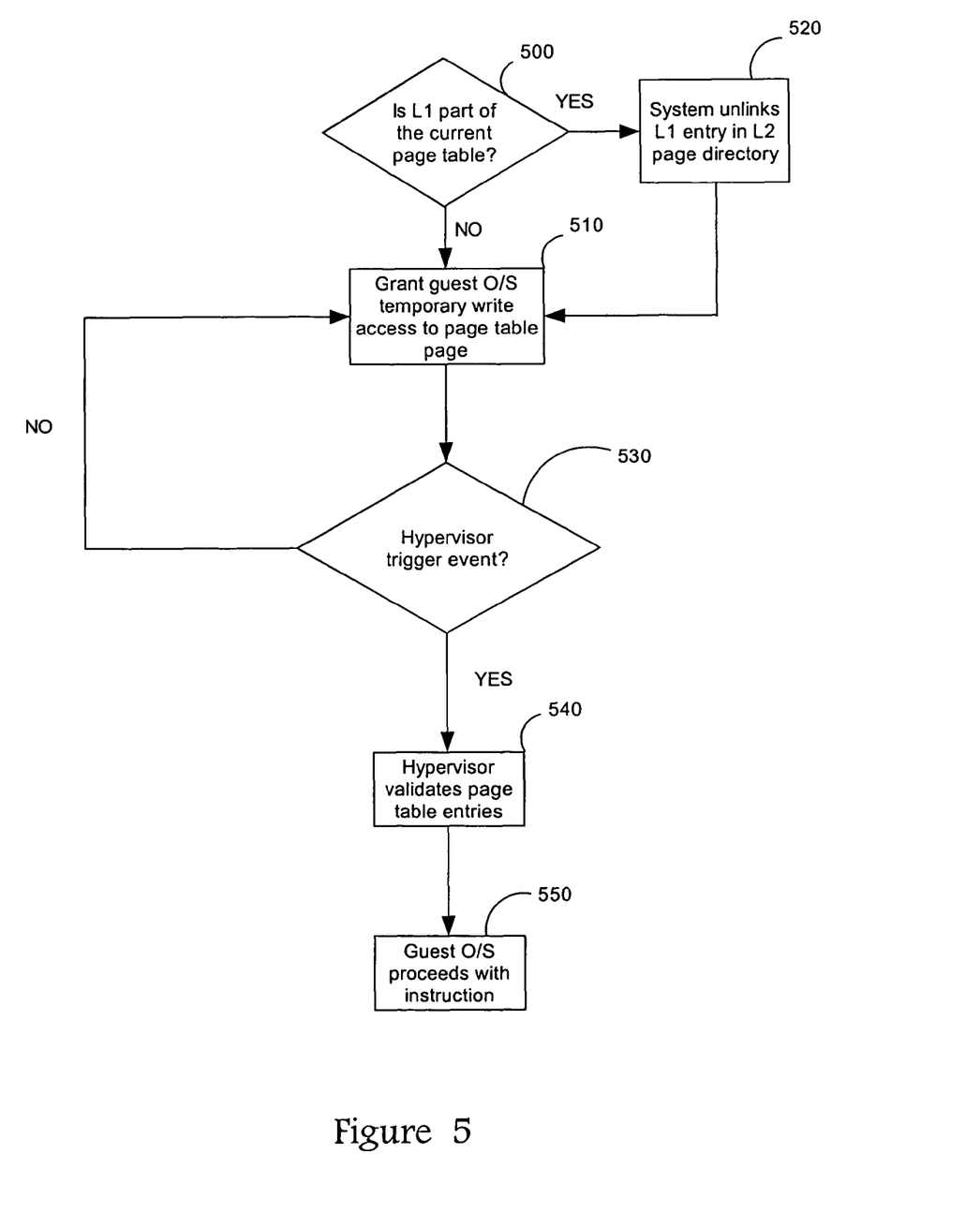
FIG. 5 is a flowchart showing a method for memory address translation in a hypervisor environment in accordance with a particularly preferred embodiment of the invention.

A summary flowchart of the above method is likewise depicted in FIG. 5. More particularly, at step 500, the system determines whether the particular L1 page that the guest OS is attempting to update is part of the current page table or part of one that belongs to some other process that is not running at the moment. If the subject L1 page is not part of the current page table, then at step 510 the guest OS is given temporary write access to that page. If, however, the subject L1 page is part of the current page table, then at step 520 the system unlinks the L1 page table entry from the L2 page directory, and thereafter the OS is given temporary write access to that L1 page at step 510. As explained above, such unlinking of the L1 from the L2 is accomplished by zeroing out the relevant entry in the L2 page directory that contains the reference to the particular L1.

After the guest OS is granted temporary write access to the relevant L1, such access is maintained until the occurrence of an event at step 530 which again triggers the hypervisor to be activated. As explained above, such trigger events may include (i) the hardware initiating a change of the page directory to a different L2, and (ii) the guest OS attempting to use a virtual address that requires the particular L1 to be used. Following activation of the hypervisor at step 530, the hypervisor validates all of the page table entries at step 540, after which control is returned to the guest OS which then reissues the particular instruction at step 550 (and proceeds with such instruction without faulting).

While prior efforts in this field did provide an effective tool to manage virtual address to physical address translation in a hypervisor environment, the current implementation of using writeable page tables in this construct provides significant improvement. More particularly, such prior efforts comprised application of the following 2 rules: (i) guest OS's could only create page table mappings to pages that are actually allocated to them, and attempts to create mappings to other pages will fail, potentially resulting in termination of the guest OS; and (ii) guests may only have read-only mappings to pages that form the page tables the hardware memory management unit (MMU) is using, such that the hypervisor must be involved with updating of page table entries to perform the necessary validation to ensure that such rules are enforced. The above-described process according to the instant invention enables a "batched" style of page table update such that it is not necessary to take a fault every time an update is required, but rather the cost of the fault may be amortized over many such updates.

Optionally, to increase the speed of validation, when the system first detects that a guest OS is attempting to write a page table page, a copy of the contents of such page table is made. At the point where the system proceeds with the validation step, the page table modified by the OS is compared against the contents of the previously recorded page table copy, and only the differences between the two are validated (because we know that the entries that are the same must have been, and remain, valid). Thus, it is only necessary to look at those entries that are different.

Also, it should be noted that the above described system and method is not limited to a single or particular architecture, and is in fact extendable to more complex page table architectures, such as the 4-level architecture used by x86_64 in which a 4-level page table is used to translate a 48 bit virtual address into a physical address. Here, pages are still 4 KB in size, but each page table entry is now 8 bytes instead of 4 bytes, and there are thus only 512 entries (indexed by 9 bits) in each level of the page table. Thus translation is performed by looking up the most significant 9 bits of the 48 bit address in the L4 (root page table page) to get the frame number of the L3 to use, using the next most significant 9 bits of the virtual address to index into the L3 to get the frame number of the L2, and so on. The final access into the L1 is indexed by the 9 bits adjacent to the 12-bit page offset, and returns the actual frame number to use for the memory access.

In this structure, in order to quickly test whether a given L1 is part of the current page table, it is no longer sufficient to store the location within the L2, since we do not know to which L2 this refers. Instead it is necessary to store the 9+9+9=27-bit virtual location specifying the full path back from the L1 to the root (i.e., which offset within the L4, which offset within the L3, and which offset within the L2). Notably, this method is suitable in cases where each L1 is used to build only a single section of the virtual address space (and the same section in each page table in which it is used), as is the case for most OS's. For those OS's for which this does not hold true, one may disable the creation of temporary writeable mappings for this L1 page (since we cannot easily determine where to unlink it from), or use additional storage to record all of the L2 entry numbers in which this L1 appears.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

The invention claimed is:

1. A method of managing memory in a processing system capable of simultaneously executing, within at least one virtual machine, multiple instantiations of one or more guest operating systems, without duplication of page tables provided by the processing system, said method comprising:

requesting, by a guest operating system executing within a virtual machine, access to write to a page in a page table provided by the processing system;

determining, by a hypervisor executing on the processing system, whether the requested page table page to which the guest operating system is attempting to write is part of a page table page currently in use by the processing system;

upon determining that said page table page is part of a page table page currently in use by said processing system, unlinking, by the hypervisor, said page table page from a page directory to which said page table page belongs; and granting said guest operating system temporary write access to said page table page.

2. The method of claim 1, further comprising:

validating entries in said page table page to confirm that such entries refer to a page table page attributed to said guest operating system, and that such entries do not act to create a writeable mapping to any other page table page.

3. The method of claim 2, further comprising:

upon said guest operating system attempting to write to said page table page, generating a copy of the contents of such page table page;

said validating step further comprising comparing said copy to said page table page after said guest operating system has modified said page table page, and validating only those entries in said page table page that are different from said copy.

4. The method of claim 2, wherein said validating step is initiated in response to an attempt by said guest operating system to access a virtual memory address that requires said page table page.

5. The method of claim 2, wherein said validating step is initiated in response to said guest operating system attempting to context switch from a first process to a second process.

6. The method of claim 2, further comprising:

before said validating step, terminating said temporary write access granted to said guest operating system so as to allow said guest operating system read-only access to said page table page; and after said validating step, linking said page table page back to said page directory to which said page table page belongs.

7. The method of claim 6, further comprising after said linking step, causing said guest operating system to reissue said instruction.

8. The method of claim 1, wherein said unlinking step further comprises invalidating an entry in said page directory corresponding to said page table page.

9. The method of claim 8, said invalidating step further comprising converting bits in the entry in said page directory corresponding to said page table page to 0.

10. The method of claim 1, said determining step further comprising:

detecting an offset of said page table page in said page directory;

determining a page table page entry in a page directory currently in use by hardware on which said processing system is operating at a location in said page directory designated by said offset; and determining whether bits in said page table page entry refer to said page table page.

11. A memory having computer readable program code means embodied therein for causing simultaneous execution, within at least one virtual machine, of multiple instantiations of one or more guest operating systems, without duplication of page tables provided by a processing system, the memory comprising:

means for determining, by a hypervisor, whether a page table page to which a guest operating system, executing within a virtual machine, is attempting to write is part of a page table page currently in use by said processing system;

means for unlinking, by the hypervisor, said page table page from a page directory to which said page table page belongs, when a determination is made that said page table page is part of a page table page currently in use by said processing system; and means for granting, by the hypervisor, said guest operating system temporary write access to said page table page.

12. A processing system for simultaneous execution, within at least one virtual machine, of multiple instantiations of one or more guest operating systems, without duplication of page tables provided by the processing system, comprising:

means for determining whether a page table page to which a guest operating system, executing within a virtual machine, is attempting to write is part of a page table page currently in use by said processing system;

means for unlinking, by the hypervisor, said page table page from a page directory to which said page table page belongs, when a determination is made that said page table page is part of a page table page currently in use by said processing system; and means for granting said guest operating system temporary write access to said page table page.

13. The system of claim 12 further comprising means for validating entries in said page table page to confirm that such entries refer to a page table page attributed to said guest operating system and that such entries do not act to create a writeable mapping to any other page table page.

14. The system of claim 13 further comprising:

means for generating a copy of the contents of such page table page, upon attempting, by said guest operating system, to write to said page table page; and means for comparing said copy to said page table page after said guest operating system has modified said page table page and validating only those entries in said page table page that are different from said copy.

15. The system of claim 13, wherein said means for validating entries further comprises means for validating entries in response to an attempt by said guest operating system to access a virtual memory address that requires said page table page.

16. The system of claim 13, wherein said means for validating entries further comprising means for validating entries initiated in response to said guest operating system attempting to context switch from a first process to a second process.

17. The system of claim 13, further comprising:

means for terminating, before validating the entries in said page table page, said temporary write access granted to said guest operating system so as to allow said guest operating system read-only access to said page table page; and means for linking, after validating the entries in said page table page, said page table page back to said page directory to which said page table page belongs.

18. The system of claim 17, further comprising means for causing, after linking, said guest operating system to reissue said instruction.

19. The system of claim 12 further comprising means for invalidating an entry in said page directory corresponding to said page table page.

20. The system of claim 19 further comprising means for converting bits in the entry in said page directory corresponding to said page table page to 0.

21. The system of claim 12, further comprising:

means for detecting an offset of said page table page in said directory;

means for determining a page table page entry in a page directory currently in use by hardware on which said processing system in operating at a location in said page directory designated by said offset; and means for determining whether bits in said page table page entry refer to said page table page.

* * * * *